March 6, 1956  J. R. BAUMGARTNER  2,737,383
METAL CUTTING APPARATUS
Filed June 12, 1952  5 Sheets-Sheet 3
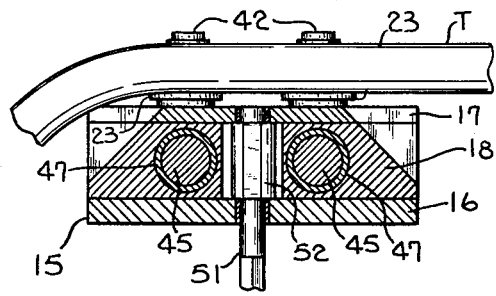
FIG. 9
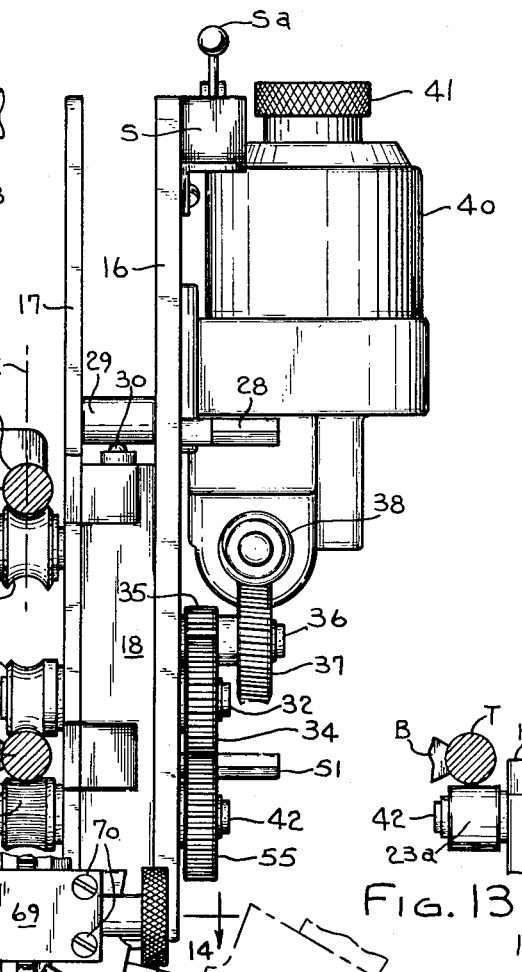
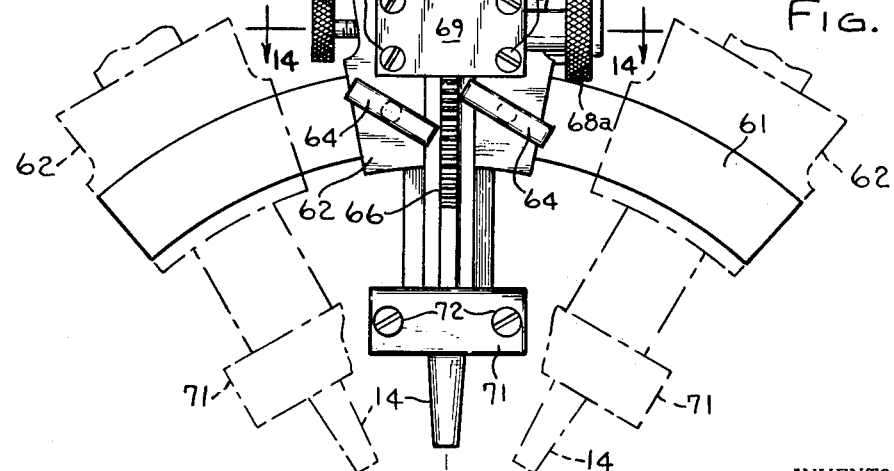
FIG. 14
FIG. 13
FIG. 5
INVENTOR.
John R. Baumgartner
BY Quarles & French
Att'ys INVENTOR.
John R. Baumgartner
BY
Charles & French
Att'ys.

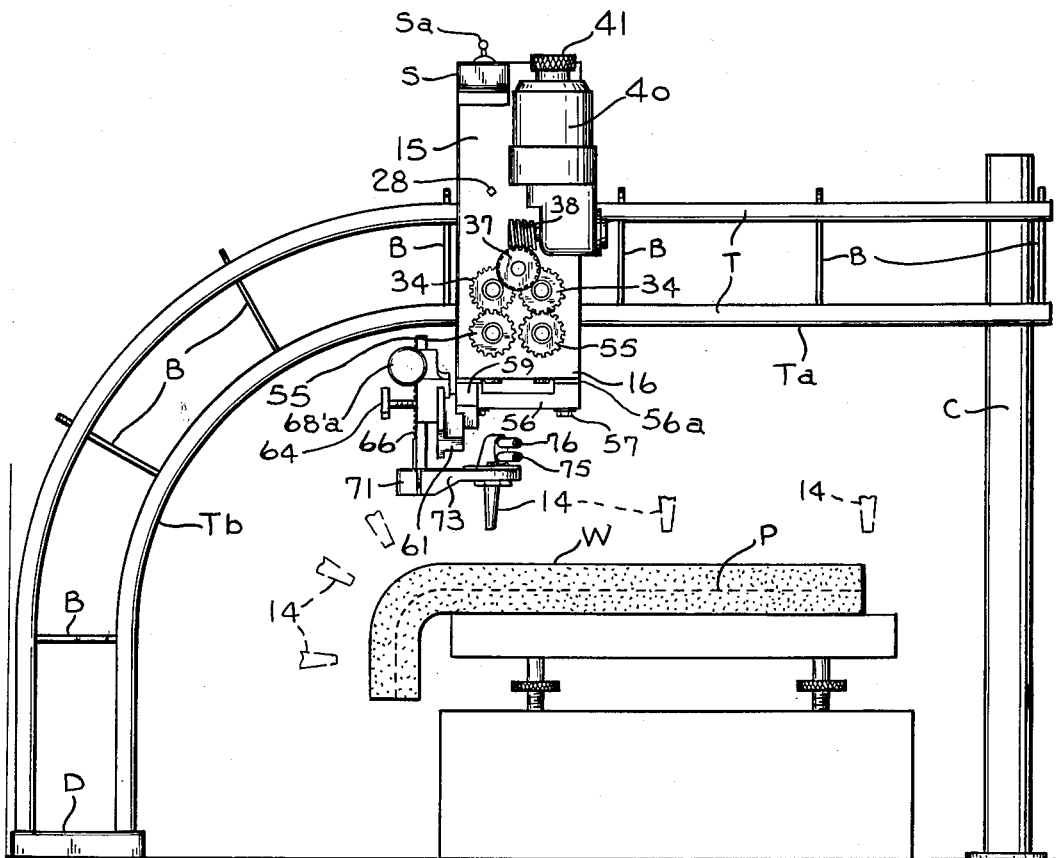
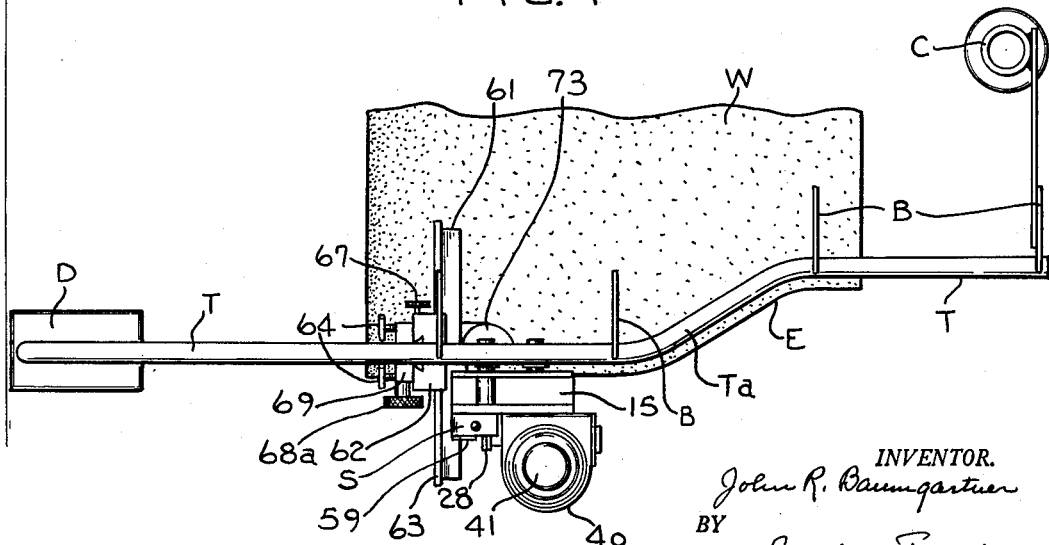

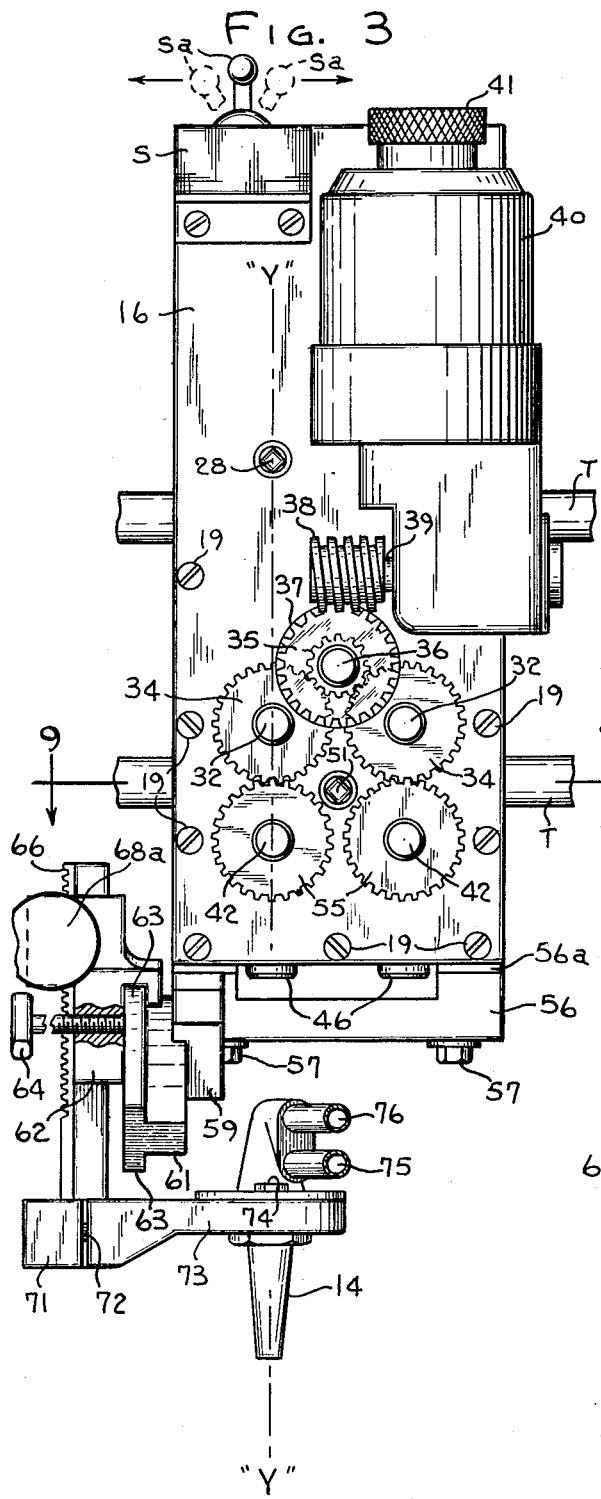

March 6, 1956 J. R. BAUMGARTNER 2,737,383
METAL CUTTING APPARATUS
Filed June 12, 1952 5 Sheets-Sheet 5

INVENTOR.
John R. Baumgartner
BY Quarles & French
Att'ys.

United States Patent Office 2,737,383
Patented Mar. 6, 1956

2,737,383
METAL CUTTING APPARATUS
John R. Baumgartner, Milwaukee, Wis.
Application June 12, 1952, Serial No. 293,079
7 Claims. (Cl. 266—23)

The invention relates to apparatus for cutting metal by means of a power driven traveling gas cutting torch of the oxyacetylene, oxy-hydrogen, or similar types.

Where large masses of metal are used to form structures of various shapes, such as engine beds and frames, large machine frames, military tank superstructures, etc., it has been found more advantageous to form these large or complicated shape structures of a number of smaller component parts welded together to form the complete structure than to cast said structures in one piece. As the component parts of such structures are separately cast pieces, their peripheral portions have to be prepared so that they can be joined by weld metal to adjacent parts, and this involves trimming their peripheries to definite contours and providing weld metal receiving scarfs. The object of this invention is to provide an apparatus by which the contour forming of the parts mentioned above is done by a torch mounted on a carriage which moves along rails of varying contour and is adapted to work in three dimensions. Torch cutting apparatus in which the torch carrying carriage works in two dimensions are known, but such apparatus is not suitable for cutting work pieces of irregular contour. Prior to the present invention no satisfactory apparatus has been available for working in three dimensions with the accuracy demanded by the trade. Several features of the present apparatus have made this possible, to wit: the form and arrangement of the track, the disposition of the torch relative to the carriage, and the mounting of the torch on the carriage as more particularly hereinafter described and claimed.

In the drawings:

Fig. 1 is an elevation view of metal cutting apparatus embodying the invention;

Fig. 2 is a plan view of the apparatus;

Fig. 3 is an enlarged front elevation view of a part of the apparatus;

Fig. 4 is a side elevation view of the parts shown in Fig. 3 looking toward the left, parts being broken away;

Fig. 5 is a view similar to Fig. 4 looking toward the right in Fig. 3;

Fig. 9 is a detailed horizontal sectional view taken on the line 9—9 of Fig. 3;

Figure 10:
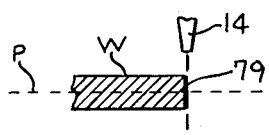
Figure 11:
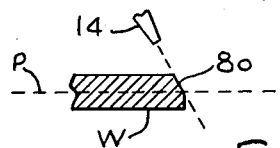
Figure 12:
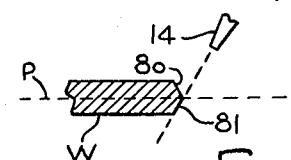
Figure 15:
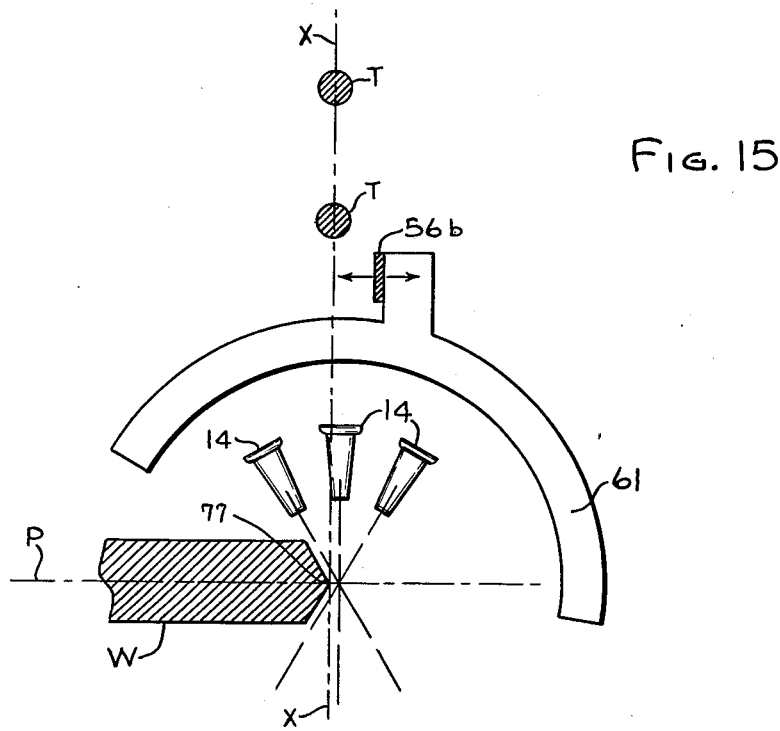
Figure 16:
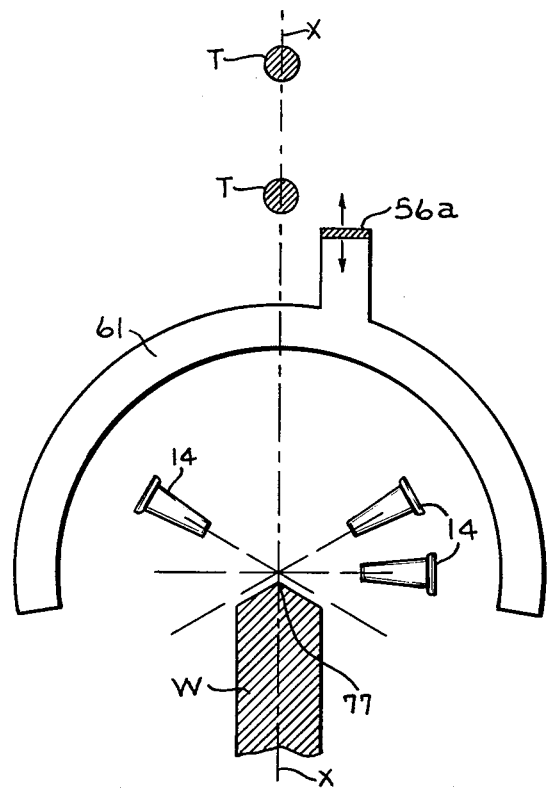

Figs. 10, 11, and 12 are illustrative views to show the path of the torch flame under different operating conditions;

Fig. 13 is a detailed view showing certain modifications;

Fig. 14 is a detailed horizontal sectional view taken on the broken line 14—14 of Fig. 5;

Figs. 15 and 16 are diagrammatic views of parts of the apparatus to illustrate the function of the shims.

As an example of the kind of work that may be handled by apparatus embodying the invention, I have shown a metal piece of work W which is of angled formation in a vertical plane and one edge E of which is to be cut to the irregular outline shown and this edge to be scarfed from a mid plane P of the piece. For accomplishing this, a template is prepared in the form of spaced tracks or rails T which are rigidly mounted relative to the work W in spaced relation therewith. As shown, the tracks T are connected together at one side by cross ties or braces B and one end of the track to a base plate D while the other end of the track is hung or supported from a pedestal C mounted on a fixed base. The track T is given a predetermined shape. For example, the portion Ta of the track is formed to conform to the desired configuration of that portion of the edge E to be cut from a part of the work lying generally in a horizontal plane while the portion Tb of the track is formed to cause the torch to follow the angular configuration of the work and cut the edge E through the angled portion of the work. While the curved portion Tb of the track is shown as extending in a single vertical plane, it will be obvious that this portion of the track could also be formed to cut an irregular outline along the angled portion of the work. Whatever the outline to be cut, the work W is placed at a predetermined distance from the track so that, for example, the locus of all points formed by a mid plane P of the work will be parallel (in the present instance) in a vertical plane to the similar formation or configuration of the track. While the base on which the track is mounted and the work is supported is shown as a horizontal plane, it will be obvious that this base might be in a vertical or any other plane found convenient. The tracks T are round metal rods spaced a substantial distance apart to provide stability for the carriage. It has been found that more accurate results can be obtained and less time and labor is required to secure these results by the use of round rod tracks bent to conform to the desired contour as compared to a member provided with spaced grooves. Also these tracks permit of a three point contact with the wheels of the carriage hereinafter described. With the above arrangement the apparatus further includes a torch 14 and a motor driven carriage 15 running on the tracks T and carrying the torch so that the flame from the torch will cut through the work to form the desired contoured and scarfed edge.

Referring to Figs. 3 to 5 and 8, the carriage 15 comprises metal side plates 16 and 17 secured to a metal body block 18 by screws 19. A guide wheel 20 is freely journalled on a stud shaft 21 mounted in the block 18 and extending laterally from the carriage to bring the wheel 20 into engagement with the underside of the upper rail or track T. An upper set of wheels 22 engage the upper part of the lower track T, and a lower set of wheels 23 engage the lower part of the lower track. All of the wheels 22 and 23 are power driven.

Figure 6:
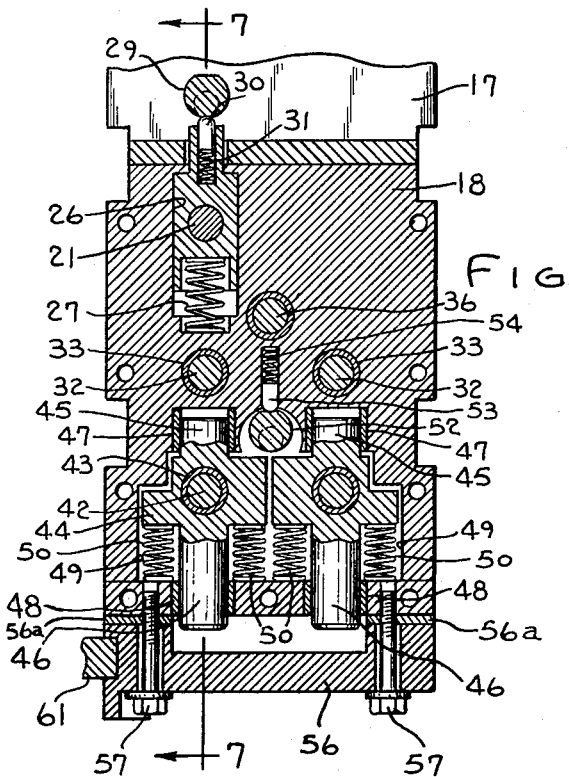
Fig. 6 is a detailed vertical sectional view taken on the line 6—6 of Fig. 4, parts being broken away.
Figure 7:
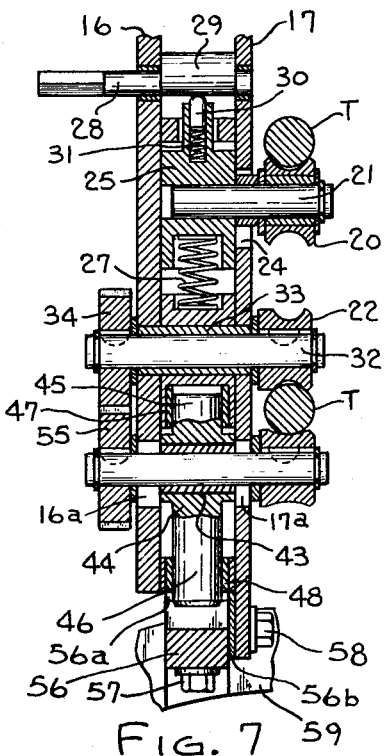
Fig. 7 is a detailed vertical sectional view taken on the line 7—7 of Fig. 6.
Figure 8:
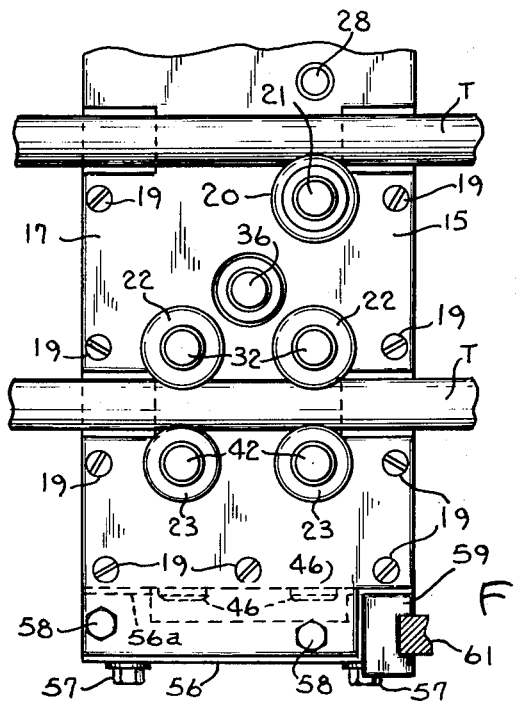
Fig. 8 is a rear elevation view of a part of the apparatus, parts being broken away.

Referring to Figs. 6 and 7, the stud shaft 21 works through a slot 24 in the side plate 17 and is mounted in a block 25 slidably mounted in a guide slot 26 in the body 18 and is yieldingly urged upwardly by a spring 27 interposed between the block 25 and the body 18 so that the wheel 20 is urged upwardly into engagement with the track. The wheel 20 preferably has a curved flange periphery. For facilitating engagement of the wheel with the track a socket key operated shaft 28 is journalled in the side plates 16 and 17 and has an eccentric portion 29 which in turning engages the extended upper end of the block 25 to move said block downwardly so that the wheel 20 is below the track. In its inoperative position, as shown in Figs. 6 and 7, the eccentric is held against turning by a detent 30 slidably mounted in a bore in the extended end of the block 25 and urged into engagement with said eccentric by a spring 31.

Each wheel 22 is keyed to one end of an axle or shaft 32 journalled in bearings 33 in the body 18 and having a gear 34 keyed to its opposite end. The gears 34 mesh with a pinion 35, mounted to turn on a stud shaft 36 anchored to the body 18, the gear 35 being integral with a worm wheel 37 adapted to mesh with a worm gear 38 mounted on a shaft 39 operatively connected to a geared head type of electric motor 40 whose housing is anchored to the side plate 16. Current is supplied to the motor through a reversing switch S whose handle Sa is moved from its central "off" position in the direction it is desired that the carriage should run as indicated by the arrows in Fig. 3. The motor is preferably a self-governed motor whose speed adjustment is effected by turning the hand wheel 41.

Each wheel 23 or 23a is keyed to one end of an axle or shaft 42 journalled in a bearing 43 mounted in a block 44 which has pin ends 45 and 46 mounted in bushings 47 and 48 in the body 18. The blocks 44 are arranged side-by-side in a recess 49 in the bottom portion of the body 18 so that they may move up and down only. Each block 44 is urged to a wheel engaging position by oppositely disposed springs 50. Slots 16a and 17a in the plates provide clearance for the shafts 42. The blocks 44 are simultaneously moved to a wheel release position by a key controlled shaft 51 provided with an eccentric 52 engageable with both blocks to depress the same and which is held in a release position by a detent 53 mounted in the body 18 and urged outwardly by a spring 54. The other end of each axle 42 has a gear 55 keyed thereto Each gear 55 meshes at all times with the gear 34 of the upper axially alined wheel 22 so that all the wheels 22 and 23 are positively driven from the motor 40.

A mounting block 56 with interchangeable shims 56a is clamped by bolts 57 to the bottom of the carriage 15. The block 56 with interchangeable shims 56b is also secured to the inner side of an extension of the plate 17 by bolts 58. Block 56 has an arcuate end portion 59 secured by screws 60 to the vertical leg of a T-shaped sector or arc-shaped member 61. A torch carrying block 62 has an arcuate channel groove 63 engaging one of the base flanges of the T member 61 to which it is adjustably clamped by thumb screws 64. Block 62 has a centrally disposed V-grooved slot 65 in which the complementary formed base of a rack 66 is slidably mounted and held in its adjusted position by a lock screw 67. A pinion 68, meshing with the rack 66, is mounted with its shaft in a plate 69 secured by screws 70 to the front face of the block 62, said shaft having an exteriorly disposed hand wheel 68a for turning said pinion to raise or lower the rack. The lower end of the rack 66 is clamped by a block 71 and screws 72 to an apertured torch receiving bracket arm 73.

The flame directing nozzle end of the torch 14 has been shown as clamped to the apertured end of the bracket arm 73 by bolts 74 and the pipes 75 and 76 have been indicated for conveying the gas used in generating the burning flame, it being noted that for most flame cutting work an oxy-acetylene torch equipped with proper controls for the supply of the separate gases to the torch nozzle is used. Torches, of course, using other gases may be used in this invention without departing from the disclosure since the basic idea of the invention is to direct a concentrated oxidizing flame upon the metal to be cut to disintegrate the metal throughout a predetermined section which is determined by the travel of the carriage relative to the work being treated.

The axis of the torch 14 is oriented relative to the track in two planes Y—Y and X—X indicated in Figs. 3 and 4, respectively. The axis of the torch is carefully adjusted to always move in the plane Y—Y which is at right angles to the tracks and passes through the axes of the vertically alined wheels 20, 22 and 23, see Fig. 8, so that the torch will move in this plane regardless of whether it is disposed in a vertical position as shown in full in Fig. 5 or in an angular position as shown in dotted lines in Fig. 5, and as a consequence the flames from the torch will always meet at the locus point 77. To secure this exact adjustment and to take care of the use of the interchangeable shims 56a and 56b, clearance is provided in the holes in the block 56 through which the bolts 57 pass and in the holes in the plate 17 through which the bolts 58 pass. The plane X—X passes through the vertical axis or center line through the tracks T and through the central portions of the peripheries of the vertically alined wheels 20, 22, and 23. The axis of the torch is alined parallel to this plane X—X but is offset relative thereto by the thickness of the shim 56b. This offsetting of the torch by the shim 56b compensates for the different nozzle sizes of torches or the width of material removed from the work by any particular torch, and the effect of this adjustment is shown in Fig. 15, it being noted that at the finish of the cut the locus line P lies in the plane X—X, where the central plane of the stock or work is at right angles to the plane X—X of the rails.

The shims 56a are used to change the position of the locus point 77 or the locus line P of these points and takes care of the cutting of the work where the center plane of the stock lines in the plane X—X of the rails, in which instance the shim 56b, if used, is one which brings the center line of the torch directly into line with the plane X—X while the shim 56a displaces the torch or the sector 61 vertically so that in its angular position, as shown in Fig. 16, the width of material taken off by any particular size torch is compensated for so that the finished operation brings the point 77 and its locus in line with the plane X—X. In this case it will be noted that no lateral adjustment of the sector 61 and torch relative to the rails is necessary if these parts are centered relative to the plane X—X.

From the above it will be noted that I have provided an up and down adjustment of the torch mounting as a whole to take care of stock removal by any particular size of torch where the center line of the stock or work lies within the plane of the rails and that a lateral adjustment of the torch mounting as a whole takes care of stock removal by any particular size torch where the center line of the stock or work is at right angles to the plane of the rails. The adjustment of the torch 14 by the raising or lowering of the rack 66 does not affect either of the above named adjustments but is merely to position the torch at the desired flame distance from the work to produce efficient cutting. It is to be noted that Fig. 5 shows the sector 61 in a position in which the torch is alined with the line X—X which is the position when cutting work where the center line thereof lies in the plane of rails.

The traction wheel 23 in vertical alinement with the wheels 22 and 20 is provided with a series of peripheral transverse grooves 78 which form a plurality of curved teeth about the periphery of the curved wheel and which, as shown in Fig. 5, preferably bear at their central portions on the track and through the pressure exerted under the action of the springs 50 actually indent the lower side of the lower track T and produce an efficient traction effect. The other wheel 23 at the left hand side of the carriage in Fig. 8 has a smooth face bearing at its central portion on the track, and while having some tractive effect, is predominantly a guide wheel. The wheels 22 also are smooth face wheels and while having some tractive effect are principally used as guide wheels though the combined tractive effort of the left hand wheel 23 and the wheels 22 will augment the tractive effort imparted to the carriage. These wheels 22 have their outer portions engaging the track so that there is a three point suspension between each of the sets of wheels 22, 23 engaging the lower track which makes for accuracy of movement of the carriage and consequently the torch 14. Instead of the plane faced grooved left hand wheel 23 in Fig. 8, a plane faced wheel 23a shown in Fig. 13 may in some instances be used.

With the above apparatus where the work W is positioned as shown in Figs. 1 and 2 so that the major portion of the work has its mid-plane P disposed at right angles to the vertical plane X—X of the rails, the carriage and the torch 14 has been offset relative to the plane X—X as previously described and the torch adjusted angularly to the desired scarf angle, the carriage with the torch is brought to the torch position X as shown in Fig. 1. The torch is then ignited and the handle of the switch S is moved to cause the motor to drive the carriage to the left as viewed in Fig. 1. Under these conditions the torch cuts scarf 80 as shown in Fig. 10 as it moves along the tracks, the inner side of which is represented by the mid-plane or line P. Then the torch is shut off and adjusted to its other angular position, and again started, and the motor reversed, and the carriage then moves back to the point X cutting the scarf 81 as shown in Fig. 11. If a straight through cut is desired, the torch 14 is adjusted to its straight line position shown in Fig. 10 to make the plain faced cut 79. When as noted above the center plane P of the work lies in the plane X—X of the rails, the torch is directly alined with this plane instead of being offset laterally, but its mounting is adjusted by the use of the shim 56b so that the apex of the scarf cuts 80 and 81 as shown in Fig. 12 will be in the mid-plane of the work. Thus work parts of varying contour may be provided with scarfed edges so that these edges when brought into juxtaposition with similar scarfed edges of other parts may be united together by welding metal deposited in the scarfs of these parts.

It is to be noted that the torch's position relative to the work is controlled by its position relative to the planes X—X and Y—Y, that these planes are at right angles to each other and pass through axes of the alined wheels 20, 22, and 23.

I desire it to be understood that this invention is not to be limited to any particular form or arrangement of parts except in so far as such limitations are included in the claims.

What I claim as my invention is:

1. In a metal cutting apparatus for one, two, or three dimensional cutting, the combination of a track comprising spaced rails mounted and adapted to be disposed in laterally spaced relation to the work to be cut and formed to a contour similar to the shape of the edge to be cut, a carriage overlying the tops of said rails and having a guide wheel engaging one of said rails and spaced sets of oppositely disposed wheels engaging the other of said rails, one of the wheels of each set of oppositely disposed wheels having a single point engagement at the central portion of its periphery with its rail while the other of the wheels of each set of oppositely disposed wheels has laterally spaced points of engagement at its periphery with said rail so that each set of oppositely disposed wheels have a three point engagement with said other rail, one of the wheels of said sets of wheels having a track indenting surface, a motor on the carriage for driving said last named wheel, said guide wheel and one of said sets of wheels including the track indenting traction wheel having their axes alined with each other in a plane at right angles to the center line through the rails, a torch, and a torch arm mounted on said carriage for carrying the torch between the work and that portion of the carriage nearest the work.

2. In a metal cutting apparatus, the combination of a track comprising spaced rails mounted and adapted to be disposed in laterally spaced relation to the work to be cut and formed to a contour similar to the shape of the edge to be cut, a carriage overlying the tops of said rails and having wheels engaging said rails, a motor on the carriage for driving one of said wheels, a torch support mounted on said carriage including a sector, a torch carrying bracket having a part engaging said sector and movable thereon to different angular positions relative to the work, means for clamping said bracket to said sector in an adjusted position, said bracket in its adjusted position adapted to position a torch mounted thereon in a plane passing through the point of contact of one of said wheels with said track, and means for adjustably securing said sector at varying distances from the bottom of and one side of the carriage at right angles thereto to compensate for the width of metal removed by the torch and to accommodate the disposition of the edge of the work being operated upon relative to the center line of the track.

3. Metal cutting apparatus as defined in claim 2 wherein the adjusting means are bolts and interchangeable shims.

4. Metal cutting apparatus as defined in claim 2 wherein the adjustment of the sector from one side of the carriage is in a plane parallel to a plane passing through the center line of the tracks and the central portions of the peripheries of some of the wheels.

5. Metal cutting apparatus as defined in claim 2 wherein the adjustment from the bottom of the carriage is toward or away from a plane parallel to the tracks.

6. In a metal cutting apparatus for one, two, or three dimensional cutting, the combination of a track comprising spaced rails mounted and adapted to be disposed in laterally spaced relation to the work to be cut and formed to a contour similar to the shape of the edge to be cut, a carriage overlying the tops of said rails and having a guide wheel engaging one of said rails and spaced sets of oppositely disposed wheels engaging the other of said rails, the guide wheel and one set of oppositely disposed wheels being alined in the same plane at right angles to said rails and one of these oppositely disposed wheels having an indenting surface, drive means including a motor on the carriage for driving said set of oppositely disposed wheels alined with said guide wheel, said rails forming the sole support for said carriage, a torch, and a torch carrying support for carrying the torch laterally inwardly of the track and carriage for movement with the carriage between the work and that portion of the carriage nearest the work so that one axis of the torch will lie in the same plane at right angles to said rails as that in which said guide wheel and oppositely disposed driven wheels are alined.

7. In a metal cutting apparatus for one, two, or three dimensional cutting, the combination of a track comprising spaced rails mounted and adapted to be disposed in laterally spaced relation to the work to be cut and formed to a contour similar to the shape of the edge to be cut, a carriage overlying the tops of said rails and having a guide wheel engaging one of said rails and spaced sets of oppositely disposed wheels engaging the other of said rails, the guide wheel and one set of oppositely disposed wheels being alined in the same plane at right angles to said rails, a motor on the carriage, gearing operatively connecting said spaced sets of oppositely disposed wheels with said motor, said rails forming the sole support for said carriage, a torch, and a torch carrying support for carrying the torch laterally inwardly of the track and carriage for movement with the carriage between the work and that portion of the carriage nearest the work so that one axis of the torch will lie in the same plane at right angles to said rails as that in which said guide wheel and said one set of oppositely disposed driven wheels are alined.

References Cited in the file of this patent
UNITED STATES PATENTS

| | | |
|---|---|---|
| 1,162,587 | Eimann | Nov. 30, 1915 |
| 2,334,301 | Young | Nov. 16, 1943 |
| 2,403,514 | Franzen | July 9, 1946 |
| 2,468,938 | McLauchlan | May 3, 1949 |